United States Patent [19]

Rogerson

[11] Patent Number: 5,358,682
[45] Date of Patent: Oct. 25, 1994

[54] METHOD AND APPARATUS FOR ROTATIONAL APPLICATION OF POLYMERS

[76] Inventor: L. Keith Rogerson, No. 9 Fourth Ave., Isle of Palms, S.C. 29451

[21] Appl. No.: 749,160

[22] Filed: Aug. 23, 1991

[51] Int. Cl.⁵ .............................................. B29C 41/06
[52] U.S. Cl. ....................................... 264/265; 264/25; 264/310; 264/DIG. 65
[58] Field of Search .......... 264/310, 265, 25, DIG. 65

[56] References Cited

U.S. PATENT DOCUMENTS

| | | |
|---|---|---|
| 1,377,592 | 5/1921 | Kuhlemeier et al. . |
| 2,125,912 | 8/1938 | George et al. . |
| 3,275,798 | 9/1966 | Martin . |
| 3,594,862 | 7/1971 | Seefluth . |
| 3,802,847 | 4/1974 | Hara et al. . |
| 3,829,272 | 8/1974 | Carillon et al. . |
| 3,841,557 | 10/1974 | Atkinson . |
| 3,907,482 | 9/1975 | Shiota et al. . |
| 3,914,361 | 10/1975 | Shiina et al. ......................... 264/310 |
| 3,914,521 | 10/1975 | Beatty et al. . |
| 3,989,787 | 11/1976 | Scott, Jr. et al. ................... 264/310 |
| 3,997,649 | 12/1976 | Pivar .................................... 264/310 |
| 4,167,382 | 9/1979 | Freedman et al. . |
| 4,263,879 | 4/1981 | Lindhal . |
| 4,285,334 | 8/1981 | Collins . |
| 4,285,903 | 8/1981 | Lemelson . |
| 4,315,725 | 2/1982 | Yoshino . |
| 4,408,689 | 10/1983 | Daniels . |
| 4,447,377 | 5/1984 | Denton . |
| 4,472,231 | 9/1984 | Jenkins . |
| 4,505,231 | 3/1985 | Syler . |
| 4,512,289 | 4/1985 | Collins . |
| 4,527,543 | 7/1985 | Denton . |
| 4,529,869 | 7/1985 | Ekstrom, Jr. . |
| 4,548,779 | 10/1985 | Steinberg et al. ................... 264/310 |
| 4,555,379 | 11/1985 | Maringer et al. ................... 264/310 |
| 4,587,318 | 5/1986 | Inoue et al. ......................... 264/310 |
| 4,722,678 | 2/1988 | Wersosky et al. . |
| 4,729,862 | 3/1988 | Salatiello et al. ................... 264/310 |
| 4,755,333 | 7/1988 | Gray . |
| 4,783,896 | 11/1988 | Stubbe et al. . |
| 4,791,888 | 12/1988 | Vago . |
| 4,808,364 | 2/1989 | Blunt et al. . |
| 4,836,963 | 6/1989 | Gilman, Jr. . |
| 4,838,211 | 6/1989 | Vago . |
| 4,889,105 | 12/1989 | Vago et al. . |
| 4,957,097 | 9/1990 | Chevalier et al. . |
| 5,094,607 | 3/1992 | Masters ............................... 264/310 |
| 5,096,775 | 3/1972 | Sato et al. . |
| 5,158,200 | 10/1992 | Vago et al. ........................... 220/465 |
| 5,205,895 | 4/1993 | Hohman, Jr. et al. . |
| 5,217,140 | 6/1993 | Lindahl ................................ 220/453 |

OTHER PUBLICATIONS

William K. Neidinger, "A Molder Views the State of the Rotocasting Art", SPE Journal, Apr. 1971—vol. 27, pp. 63–66.

J. Arnold Nickerson, "Rotational Molding," 1970–1971 *Modern Plastics Encyclopedia,* pp. 600–602.

BP Product Bulletin, Polybond 1000, 1001, 1002, and 1003.

(List continued on next page.)

*Primary Examiner*—Jeffery Thurlow
*Attorney, Agent, or Firm*—Dority & Manning

[57] ABSTRACT

A method and apparatus for rotationally applying polymers where the apparatus includes a rotational lining unit with a first support section rotatably secured to a main frame for rotation about a first axis, and a second support section secured to the first support section for rotation about a second axis. The second support section includes a portion for holding an enclosed structure to be lined. The unit also includes drive arrangements for driving the first and second support sections so that an enclosed structure can be held by the holding portion and rotated simultaneously about a plurality of axes.

10 Claims, 11 Drawing Sheets

OTHER PUBLICATIONS

BP Technical Notes, Polybond, Grades Used as Additive in Filled Compounds.

BP Technical Notes, Polybond, Grades Used for Adhesion to Metals and Polar Polymers.

BP Chemicals, Material Safety Data Sheet, Polybond 1001.

BP Product Bulletin, Polybond 1016.

BP Product Bulletin, Polybond 2021.

Duron Self-Cleaning Water Heaters Brochure, USI, Petrothene Polyolefins . . . a processing guide, Fifth Edition, 1986.

"PLEXAR Adhesive Resins, The Uncommon Bond", USI Chemicals Company.

"PLEXAR PX 232 Metal Bonding and Coating Resin", Quantum Chemical Corporation.

"Plastic Flamecoat Systems, Inc., Portable Thermoplastic Spraying", Plastic Flamecoat Systems, Inc., A Division of League Investments Corporation "POLYBOND Product Bulletin", BP Chemicals, BP Performance Polymers, Inc.

METHOD AND APPARATUS FOR ROTATIONAL APPLICATION OF POLYMERS

BACKGROUND OF THE INVENTION

The present invention relates generally to a method and apparatus for rotationally applying polymers and more particularly to a novel method and apparatus for lining structures such as tanks and the like. The present invention also relates to an improved apparatus for molding hollow plastic articles and to an improved tank or vessel with a protective polymeric lining.

Rotational molding is a known process utilized to form hollow plastic vessels and the like. Generally, in a known rotational molding process, a polymeric material such as polyethylene is loaded into a mold and the mold is subjected to heat such as in an oven while it is simultaneously rotated about two axes. As the mold is rotated, and the polymeric material melts, the polymeric coats the interior of the mold to form a hollow structure with a substantially uniform wall thickness. After an appropriate amount of time, the mold is removed from the oven and cooled so as to solidify the polymeric material. Then, the mold is opened and the hollow molded plastic product is removed.

Numerous rotational molding apparatus and processes are known for molding hollow plastic containers. Such are illustrated, for example, in U.S. Pat. No. 4,167,382 to Freedman et al., U.S. Pat. No. 4,722,678 to Wersosky, U.S. Pat. No. 4,836,963 to Gilman, Jr., U.S. Pat. No. 3,829,272 to Carillon et al., U.S. Pat. No. 3,907,482 to Shiota et al., U.S. Pat. No. 4,285,903 to Lemelson and U.S. Pat. No. 4,755,333 to Gray. All of these methods and apparatus are adapted for the rotational molding of hollow plastic forms. However, prior art rotational molding apparatus have heretofore been substantially limited in the number of molds that could be handled at one time.

In addition, it has not heretofore been appreciated to provide a rotational lining apparatus and method whereby an enclosed structure such as a water tank or storage drum or the like can be lined with a polymeric material using a rotational application technique. In the prior art, structures such as water tanks and the like have traditionally been lined with glass linings or metal linings, or have been utilized unlined. Many prior art methods and apparatus have been utilized for the purpose of lining structures such as water heaters and the like to prevent corrosion and extend their useful life. For example, U.S. Pat. No. 3,275,798 discloses a domestic water heater with the inside of the tank coated with a layer of cellular plastic foam 28 and discloses several methods of applying such foam including spraying on the inner wall surface and centrifugally casting the foam on the inner wall surfaces. It is recognized in U.S. Pat. No. 3,275,798 that when lining such a tank by centrifugally casting the foam on the inner wall surfaces, the end walls require special handling to coat. The process described with regard to centrifugal casting is to rotate the tank slowly while foaming ingredients are being distributed over the inner wall surfaces of the tank, and then to increase the rotation rate to evenly distribute the mixture along the wall surfaces of the tank. This rotation fails to properly coat the end surfaces of the tank and requires additional handling and processes to completely line a tank structure. Another example is provided in U.S. Pat. No. 4,783,896 which discloses a method of making a cathodically protected water heater. This patent discloses lining a water heater with a coating of metal that is anodic to steel, such as aluminum, magnesium, zinc or alloys thereof. The '896 patent also discloses and discusses glass lining of water heaters and the problems thereof.

SUMMARY OF THE INVENTION

The present invention recognizes and addresses the foregoing disadvantages, and others, of known methods and apparatus for rotationally applying polymers.

Accordingly, it is an object of the present invention to provide an improved method and apparatus for lining enclosed structures.

It is another object of the present invention to provide an improved method and apparatus of lining vessels such as water heaters.

It is another object of the present invention to provide an improved method and apparatus for providing a protective polymeric lining to completely cover the interior of a vessel.

It is another object of the present invention to provide an improved process and apparatus effective to extend the useful life of enclosed structures such as water heaters and the like.

It is another object of the present invention to provide an improved method and apparatus that can simultaneously line a multitude of enclosed structures.

It is another object of the present invention to provide a method and apparatus that effectuates even and complete coating of internal components contained within an enclosed structure to be lined such as, for example, a flue extending through the center of a gas fired water heater.

It is another object of the present invention to provide an improved method and apparatus for lining enclosed structures with a polymeric material that chemically bonds with inside surfaces of the enclosure.

It is another object of the present invention to provide an improved apparatus for rotationally molding hollow plastic articles.

Still another object of the present invention is to provide an improved lined enclosed structure such as a water tank or the like.

These and other objects are achieved by providing a rotational lining apparatus for lining an enclosed structure, the rotational lining apparatus comprising a main frame. The rotational lining apparatus also comprising a first support means rotatably secured to the main frame for rotation about a first axis, a second support means secured to the first support means and adapted for rotation about a second axis, the second support means including means for holding the enclosed structure, and means for driving the first and second support means about the first and second axes respectively, whereby an enclosed structure can be held by the holding means and rotated simultaneously about the first and second axes.

In one preferred embodiment, the first support means comprises a skeletal frame defining an opening therethrough, and the second support means comprises a frame rotatable within the skeletal frame about the second axis. Further, the holding means may comprise first and second longitudinally spaced end members, the first and second end members being adapted to matingly engage with elements on the enclosed structure so as to maintain the enclosed structure securely within the rotational lining apparatus during operation.

In another preferred embodiment, the first support means may comprise a longitudinally extendable rotatable hub and the second support means may comprise a first portion integrally connected to the hub for rotation therewith, and a second portion secured to the holding means and rotatable therewith about the second axis. The apparatus may also include a plurality of second support means secured to the hub and they may be located in a common plane forming a multiple structure holding assembly. In addition, the apparatus may include a plurality of the multiple structure holding assemblies spaced longitudinally along its length. In a preferred embodiment, the enclosed structure may include a hollow internal member extending therein and the apparatus may include means for preheating the hollow internal member.

These and other objects of the present invention are also accomplished by providing a system for lining enclosed structures, the system comprising a plurality of rotational apparatus for lining enclosed structures, each said rotational apparatus including a main frame, each said main frame including a first support means rotatably secured to the main frame for rotation about a first axis. The apparatus further including a second support means secured to the first support means and adapted for rotation about a second axis, the second support means including means for holding the enclosed structure. The apparatus further including means for driving the first and second support means about the first and second axes respectively, whereby an enclosed structure can be held by the holding means and rotated simultaneously about the first and second axes. The system further includes an oven adapted to receive at least one of the main frames at a time for heating the structures, and primary guide means for directing the plurality of main frames between a loading position and the oven.

In a preferred embodiment, the system may also include a loading cart adapted to receive a plurality of enclosed structures and to move the structures into alignment with the holding means, the loading cart including means for lifting the enclosed structures into engagement with the respective holding means for loading the main frames with structures to be lined.

These and other objects are also accomplished by providing a rotational process for lining the interior of enclosed structures such as vessels and the like, the process comprising the steps of securing an enclosed structure to a frame adapted to rotate the enclosed structure about a first and second axis. The process also comprising the step of loading the interior of the enclosed structure with a charge of polymeric material for bonding to the inside surface of the enclosed structure for substantially complete coverage of the inside surface. The process further including the step of rotating the charged structure simultaneously about the first and second axes, and heating the structure during the rotation to a temperature sufficient to cause melting of the polymeric material to ensure flow about the inside surface of the enclosed structure and subsequent chemical bonding of the polymeric to the inside surface. In a preferred embodiment, the polymeric material is a polyolefin having one or more functional monomers chemically attached thereto.

These and other objects and advantages are also accomplished by providing an enclosed vessel such as a water tank or the like, the vessel comprising an enclosed metal structure, the metal structure including an inside surface capable of oxidation. The enclosed vessel further including a protective polymeric lining covering substantially all of the inside surface, the protective polymeric lining being chemically bonded to the inside surface. In a preferred embodiment, the protective lining comprises a polyolefin having one or more functional monomers chemically attached thereto.

These and other objects are also accomplished by providing a rotational molding apparatus for molding hollow polymeric structures, the rotational molding apparatus comprising a main frame, a first support means rotatably secured to the main frame for rotation about a first axis, the first support means comprising a longitudinally extending rotatable hub. The rotational molding apparatus further comprising a second support means secured to the first support means and adapted for rotation about a second axis, the second support means including means for holding at least one mold, the second support means comprising a first portion integrally connected to the hub for rotation therewith and a second portion secured to the holding means and rotatable therewith about the second axis. The apparatus further comprising means for driving the first and second support means about the first and second axes respectively, whereby at least one mold can be held by the holding means and rotated simultaneously about the first and second axes. In a preferred embodiment, the apparatus includes a plurality of second support means secured to the hub, and the plurality of second support means are located in a common plane forming a multiple mold holding assembly. In a further preferred embodiment, the hub includes a plurality of multiple mold holding assemblies spaced longitudinally along its length.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying figures in which.

Figure 1:
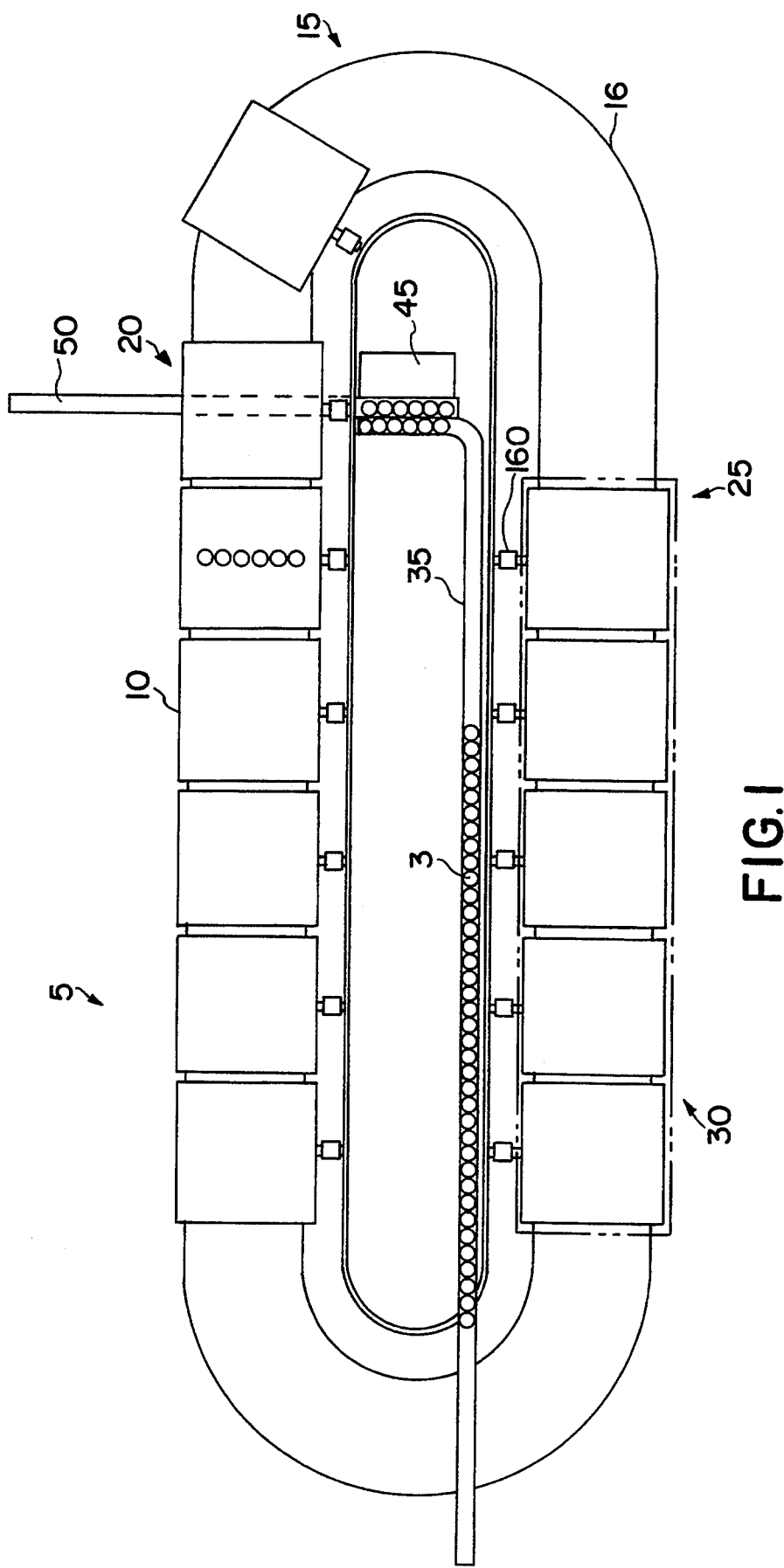
FIG. 1 is a schematic of one embodiment of a system in accordance with the present invention.

Repeat use of reference characters in the present specification and drawings is intended to represent same or analogous features or elements of the invention.

DETAILED DESCRIPTION OF PREFERRED EMBODIMENTS

It is to be understood by those of ordinary skill in the art that the present discussion is a description of exemplary embodiments only, and is not intended as limiting the broader aspects of the present invention, which broader aspects are embodied in the exemplary constructions.

Referring to FIG. 1, a system for lining enclosed structures 3 is generally illustrated at 5. System 5 includes a plurality of rotational apparatus 10 which are located on primary guide means generally 15. As illustrated herein, primary guide means 15 may include a track with rails 16. Rotational apparatus 10 are adapted to travel on primary guide means 15 from a loading position illustrated generally at 20 where enclosed structures are loaded onto rotational apparatus 10 to an oven position illustrated generally at 25 where heat is applied during the rotational process. An oven adapted to receive at least one of the rotational apparatus 10 at a time for heating the structures 3 to be lined is illustrated generally at 30. The oven may include any conventional heating source such as gas or electrical and includes conventional time and temperature controls. Although primary guide means 15 are illustrated as rails 16, it is within the scope of the present invention for the guide means to be any suitable means for guiding rotational apparatus 10 into oven 30. Suitable means would include, for example, floor rails, overhead rails, an electronic guidance system, or manual guidance into the oven if desired.

As illustrated in FIG. 1, system 5 also includes conveyor means 35 for transporting structures 3 to loading position 20. System 5 includes a loading cart 45 which is adapted to receive a plurality of structures 3 and move them into position to be loaded onto the rotational apparatus as will be described below. System 5 further includes additional conveyor means 50 for transporting lined enclosed structures away from system 5. As embodied herein, conveyor means may include a conventional conveyor belt arrangement or any other means for moving a plurality of enclosed structures 3 from one location to the other. An additional loading cart 45 may be provided to operate in conjunction with additional conveyor means 50 for unloading lined structures from system 5, or loading cart 45 may be adapted to both load and unload structures in the main frame.

Oven 30 includes doors (not illustrated) that are adapted to close during the heating process to maintain heat therein. Drive means for rotational apparatus 10 are generally illustrated at 160 and described in detail hereinafter. In a preferred embodiment, the oven doors are adapted to close in such a manner to maintain the drive means 160 outside of the heated oven area. The doors may, for example, clamshell around a shaft of the drive means so that the drive means will not be required to withstand the heat produced in oven 30.

Figure 2:
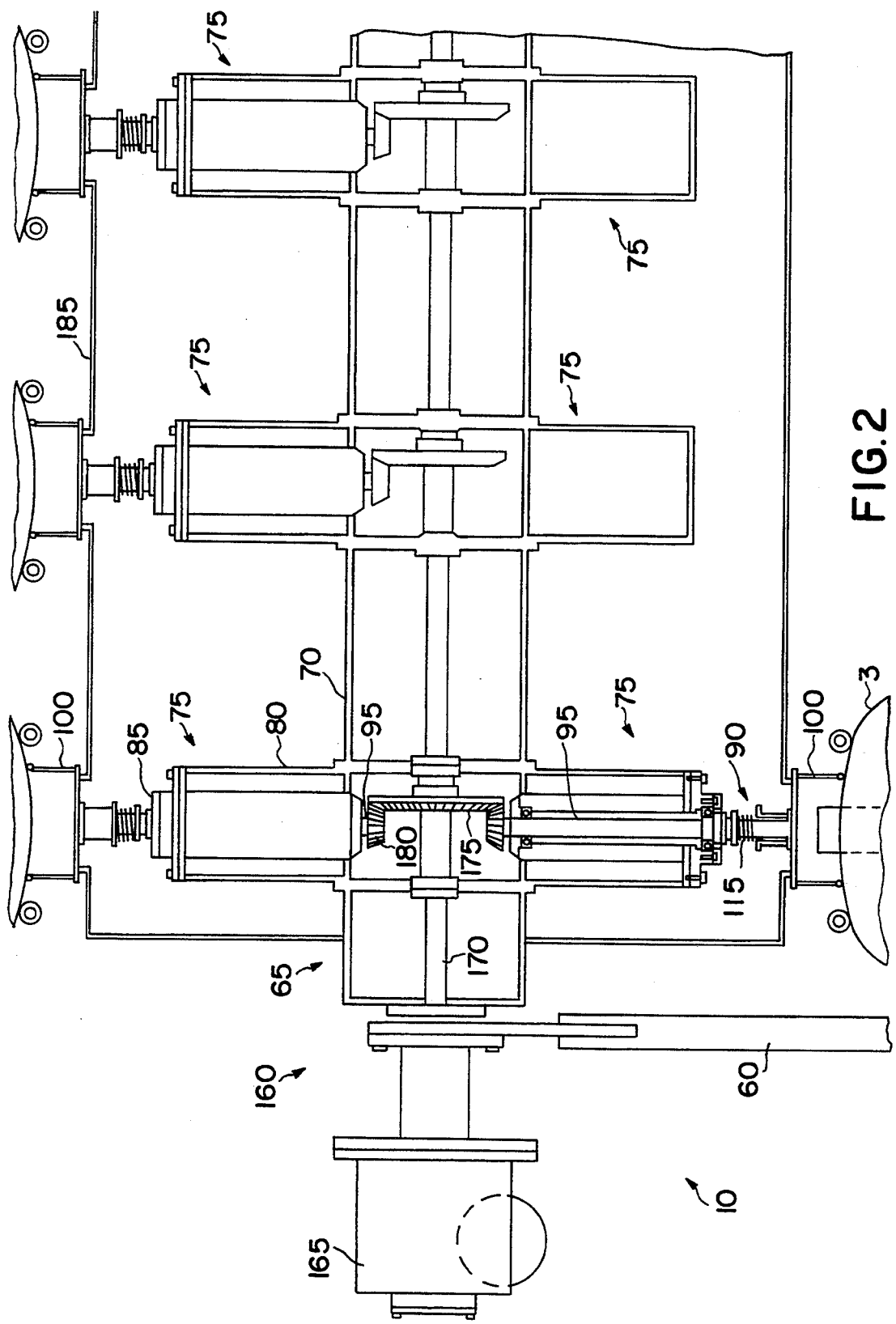
FIG. 2 is a cross-sectional view of a portion of a rotational apparatus in accordance with one embodiment of the present invention.
Figure 3:
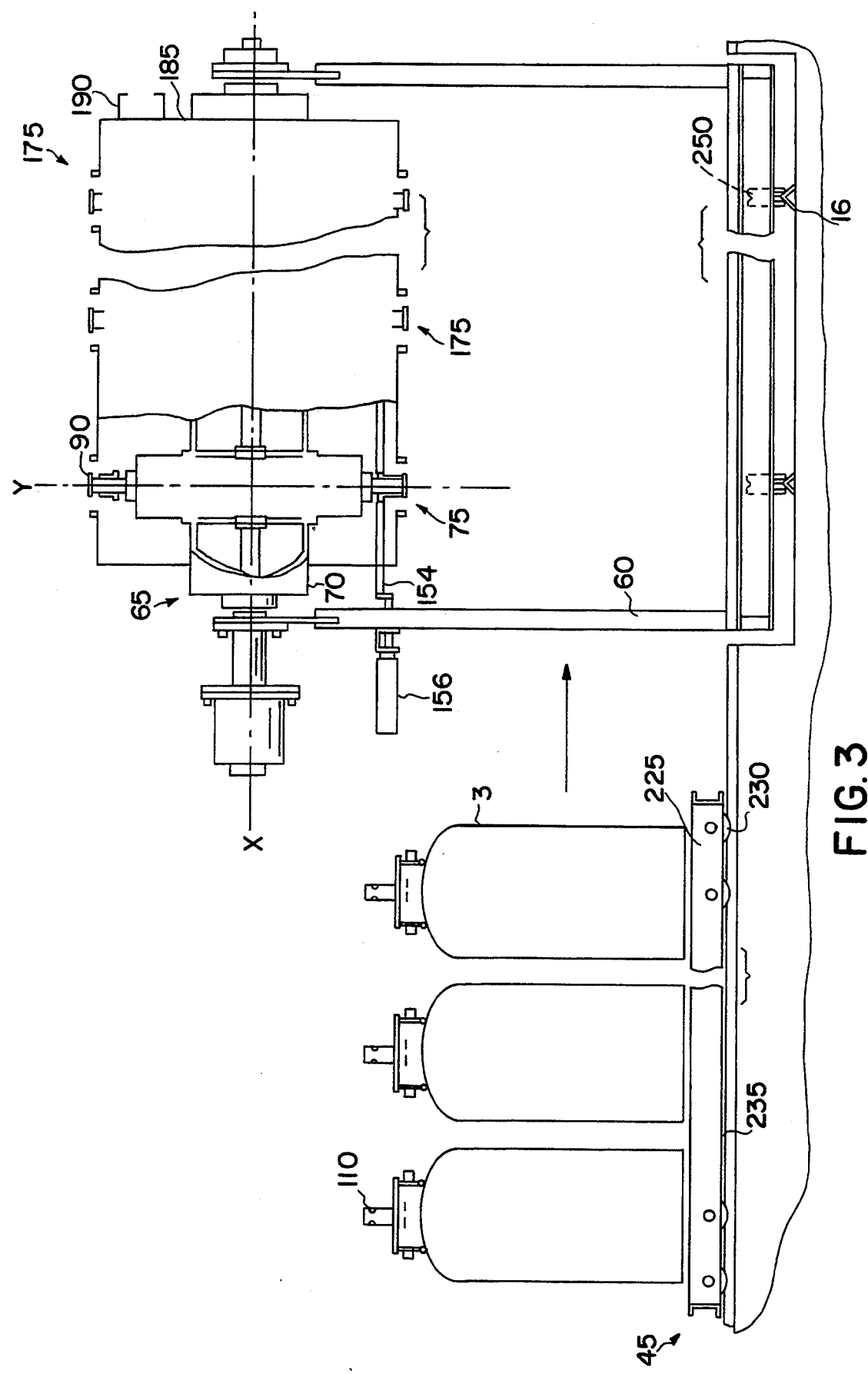
FIG. 3 is a front view of a rotational apparatus and loading cart, with parts broken away, in accordance with one embodiment of the present invention.

Referring to FIGS. 1-7, one embodiment of rotational apparatus 10 for lining enclosed structures is illustrated. As embodied herein, lining enclosed structures is used to describe application of a polymeric coating to the interior of the structure so that the polymeric coating becomes permanently attached or bonded to inside walls of the structure and wherein the structure is adapted for its final use to be with the protective lining in place. Referring specifically to FIGS. 2 and 3, rotational apparatus 10 includes a main frame 60 and a first support means generally illustrated at 65. First support means 65 is rotatably secured to main frame 60 for rotation about a first axis X. As embodied herein, first support means 65 includes a longitudinally extending rotatable hub 70.

Rotational apparatus 10 also includes a second support means, generally illustrated as 75, secured to the first support means 65 and adapted for rotation about second axis Y. As embodied herein, second support means 75 includes first portion 80 integrally connected to hub 70 for rotation therewith, and a second portion 85.

Second support means 75 includes means for holding an enclosed structure. As embodied herein, the means for holding an enclosed structure is generally illustrated at 90. Second portion 85 is secured to said holding means 90 and rotatable therewith about said second axis Y. As embodied herein, second portion 85 includes rotatable shaft 95 (see also FIG. 4) extending radially outwardly from hub 70. Holding means 90 are secured to said radially extending shaft 95 for rotation therewith about second axis Y. As best illustrated in FIG. 3, rotational apparatus 10 may include wheels 250 adapted for movement on rails 16.

Figure 4:
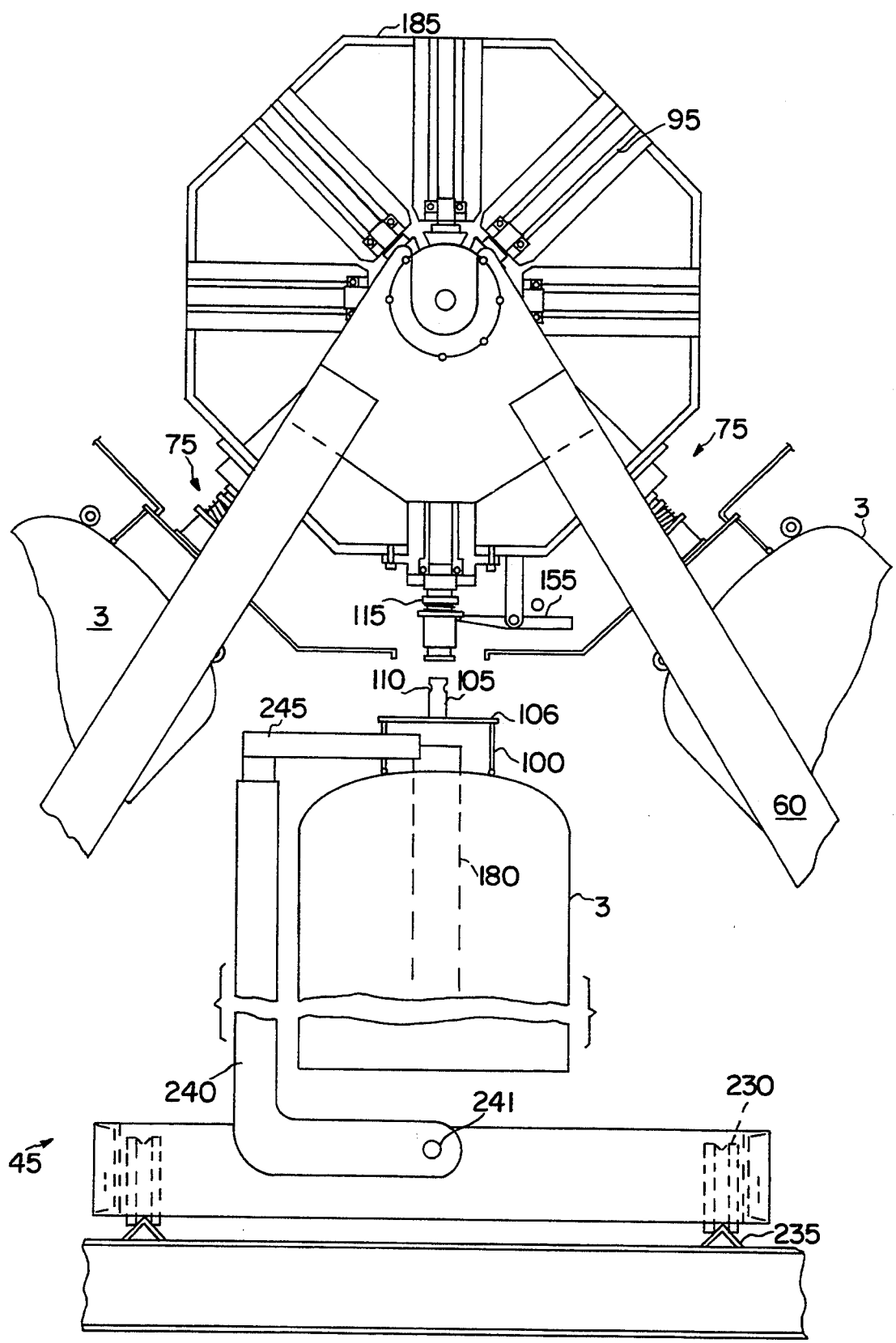
FIG. 4 is an end view of a rotational apparatus and loading cart in accordance with an embodiment of the present invention.
Figure 5:
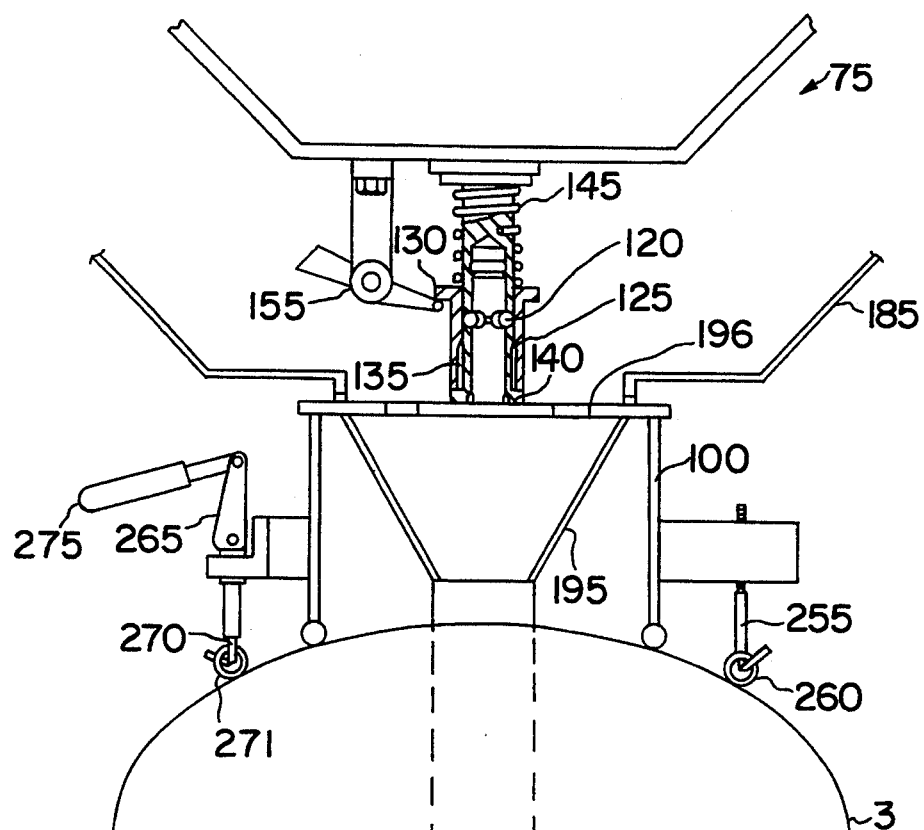
FIG. 5 is a cross-sectional view of an attachment structure and holding means in accordance with one embodiment of the present invention.
Figure 6:
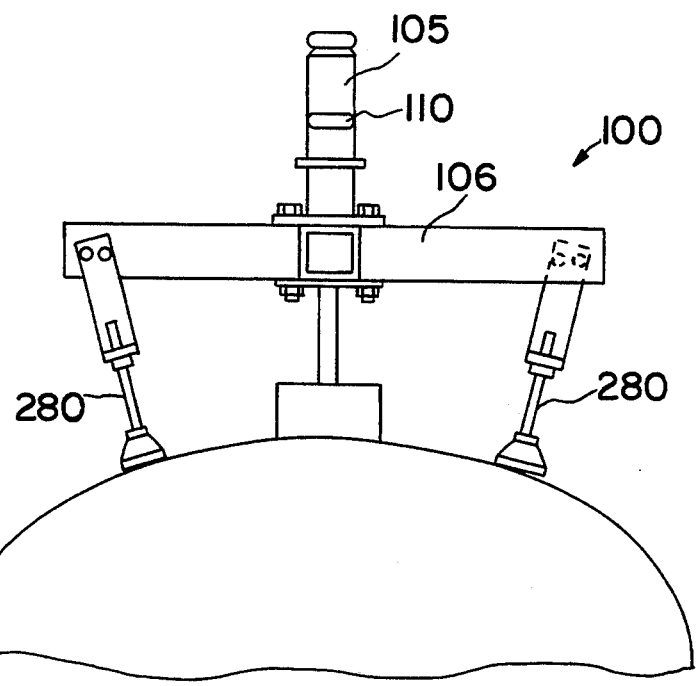
FIG. 6 is an elevational view of the attachment structure of FIG. 5, but rotated 90 degrees.

As illustrated in FIGS. 4, 5 and 6, rotational apparatus 10 includes attachment structure 100 adapted for releasable attachment to enclosed structure 3. Attachment structure 100 includes a portion 105 adapted for mating engagement with holding means 90 whereby enclosed structure 3 can be releasably held by holding means 90. As embodied herein, attachment structure portion for mating engagement with holding means 90 is a connection shaft 105 including a slot 110 extending about less than the entirety of its circumference. Holding means 90 includes a spring loaded connection mechanism 115 with a spring loaded portion 120 (see FIG. 5) fitting into slot 110 whereby when said holding means 90 is rotated, portion 120 will engage an end of slot 110 and effect rotation of enclosed structure 3 with holding means 90 about second axis Y.

As best illustrated in FIG. 4, spring loaded connection mechanism 115 is adapted to releasably engage connection shaft 105. As best illustrated in FIG. 5, spring loaded connection mechanism 115 includes an outer slidable portion 125 with a flange 130. Outer sliding portion 125 has a tapered section 135 and is adapted to be moved vertically on inner portion 140. Spring 145 biases outer slidable portion 125 in a manner so that portion 120 is forced inward by outer sliding portion 125 and is maintained in slot 110. Spring loaded connection mechanism 115 includes a handle 155 that is adapted to push flange 130 vertically, moving outer slidable portion 125 so that its tapered portion 135 will be aligned with retaining portion 120 and therefore allow it to release from slot 110.

Rotational apparatus 10 further includes means for driving the first and second support means 65 and 75 about said first and second axes, respectively, so that an enclosed structure can be held by holding means 90 and rotated simultaneously about first and second axes X and Y. As embodied herein, and best illustrated in FIG. 2, means for driving 160 generally includes a drive motor 165 connected either directly or through a gear arrangement to shaft 170 that extends within hub 70. The output of drive motor 165 is also secured to hub 70 so that when the motor is activated, hub 70 in its entirety will rotate. In addition, shaft 170 is connected through bevel gears 175, 180 to rotatable shaft 95 so that when drive motor 165 is activated, hub 70 rotates about first axis X and also shaft 170 causes rotation of holding means 90 through rotatable shaft 95 about second axis Y.

Referring to FIGS. 2, 3 and 4, rotational apparatus 10 includes a plurality of second support means 75 secured to hub 70. The plurality of second support means 75 secured to hub 70 are located in a common plane as illustrated in FIG. 2 forming a multiple structure holding assembly. Further, hub 70 may include a plurality of multiple structure holding assemblies spaced longitudinally along its length as illustrated in FIGS. 2 and 3. A release rod 154 may be provided extending the length of hub 70 and operatively associated with each handle 155 for simultaneously engaging each of the handles of the holding means along a longitudinal section of the hub and causing simultaneous release of the holding means 90. While illustrated in FIG. 3 as an eccentric arrangement, release rod 154 may be actuated by means of a pneumatic or hydraulic actuating cylinder as illustrated at 156 in FIG. 3, or any other suitable actuating means. In addition, unit 156 may be located on a support separate from main frame 60 so as not to interfere with movement of loading cart 45 into position.

Enclosed structure 3 is a substantially hollow vessel and may include a hollow internal member 180 extending therein. Apparatus 10 may also include means for preheating hollow internal member 180. One preferred means for preheating hollow internal member 180 is illustrated in FIGS. 3 and 5. As embodied herein, the means for preheating hollow internal member 180 includes an outer shell duct 185 substantially surrounding hub 70 for rotation therewith. Outer shell duct 185 includes hot air entrance 190 and internal duct portion 195 whereby hot air may be introduced into outer shell duct 185 and forced through the outer shell duct and into the individual internal duct portions 195, through openings 196 in top plate 106, down through hollow internal member 180 for preheating the internal member 180 via internal air flow. The hollow internal member 180 may be, for example, a flue pipe in an embodiment where the enclosed structure 3 is a gas-fired hot water tank.

Figure 7:
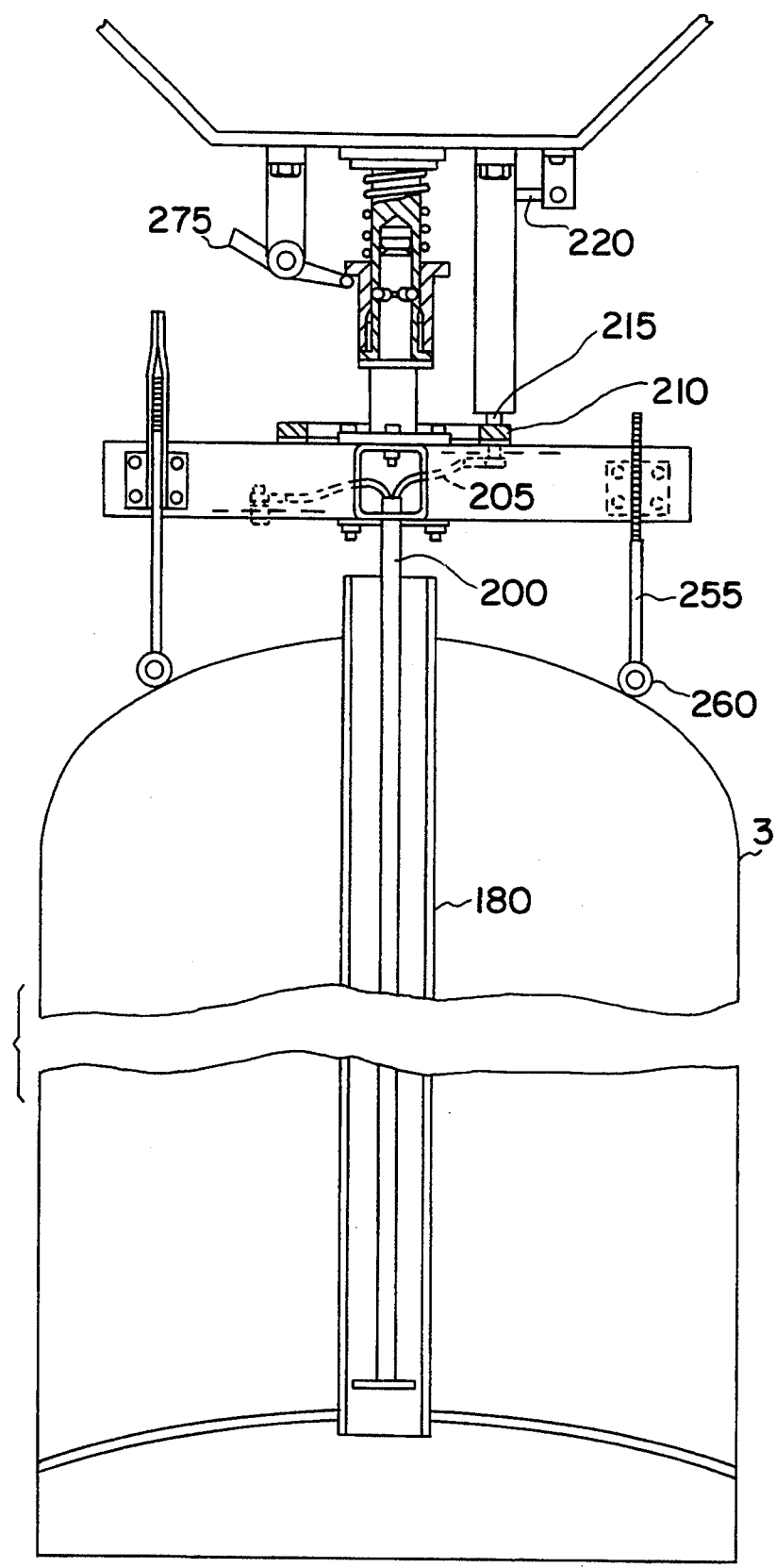
FIG. 7 is a cross-section of a portion of the present invention illustrating preheating a hollow internal member by electrical means.

FIG. 7 illustrates another embodiment of the means for preheating hollow internal member 180. In the embodiment illustrated in FIG. 7, rather than use of heated air, an electrical heating rod 200 is removably inserted within hollow internal member 180. Electrical heating rod 200 is connected via wiring 205 to an electrical contact ring 210 which is in sliding contact with electrical contact 215 as holding means 90 and enclosed structure 3 are rotated. Electrical contact 215 may be connected to an electrical source through a bus bar 220 that connects to an electrical rod for each enclosed structure in the rotational apparatus 10. Electrical power may be provided to the bus bar 220 or electrical contact 215 by any suitable means such as, for example, an electrical contact ring located on the main frame for contact with an electrical contact connected to rotatable hub 70, with the electrical contact ring being in communication with a source of electrical power. Of course, any other suitable means of providing electrical power to heating rod 200 would be within the scope of the present invention.

Referring now to FIGS. 1, 3 and 4, a more detailed description will be provided of loading cart 45. As best illustrated in FIG. 3, loading cart 45 includes a base portion 225 that is adapted to receive a plurality of enclosed structures 3 thereon. Loading cart 45 includes wheels 230 that are adapted to matingly engage rails 235 so that structures 3 can be placed on loading cart 45 and moved into alignment with holding means 90 by movement of loading cart 45. Such is accomplished by positioning loading cart 45 within frame 60 as illustrated by the direction arrow in FIG. 3. As illustrated in FIG. 3, rails 16 may be located below rails 235 so that cart 45 can be received within main frame 60.

Base 225 of loading cart 45 supports a means for lifting enclosed structures into engagement with respective holding means. As embodied herein, and best illustrated in FIG. 4, the means for lifting includes a first portion 240 pivotally attached to base 225 at pivot 241 and a second portion 245 adapted to engage a portion of a structure 3 to be lined. This engagement may be by any means suitable to hold structure 3 such as by contacting attachment structure 100 in a manner to allow for a vertical lift. One example would be for portion 245 to extend between enclosed structure 3 and top plate 106 of attachment structure 100 and lift enclosed structure 3 by force applied to top plate 106.

First and second portions 240 and 245 are movable with respect to each other so that the means for lifting can be pivoted into engagement with structure 3 and thereafter second portion 245 moved with respect to first portion 240 so as to lift structure 3 into engagement with holding means 90. Movement of second portion 245 with respect to first portion 240 may be accomplished by any conventional means such as hydraulic or pneumatic cylinders or electric motor drive. First portion 240 is pivotally attached to base 225 so that the lifting means can be pivoted out of the way after the structures 3 are loaded into the rotational apparatus. As would be apparent to one skilled in the art, elements 240, 245 should be dimensioned so as to have sufficient clearance with respect to the other enclosed structure when pivoted out of engagement with the enclosed structure being lifted. As best illustrated in FIGS. 3 and 4, a plurality of enclosed structures 3 may be arranged on loading cart 45 and loading cart 45 advanced to a position within main frame 60 and aligned with holding means 90 whereby the means for lifting structures 3 may be actuated to simultaneously engage a plurality of enclosed structures with respective holding means. In addition, the loading cart and means for lifting may also be utilized to unload enclosed structures 3 from holding means 90 by essentially reversing the loading operation.

As illustrated in FIGS. 5 and 6, attachment structure 100 may include a hook type connector 255 adapted to engage a connection portion 260 on enclosed container 3. Connection portion 260 may be, for example, a washer welded to enclosed structure 3. On an opposite side of hook type connector 250 is a releasable connection mechanism 265 that may include a hook type connector 270 and a handle 275 whereby hook connector 255 can be inserted into connection portion 260 and attachment structure 100 pivoted to a position flush with enclosed structure 3 whereby hook portion 270 may engage connection portion 271. Releasable connection mechanism 265 may include a cammed internal surface actuated by handle 275 so that when pivoted to a locking position, it will cause hook type connector 270 to tightly engage connector portion 271 and securely hold enclosed structure 3 in place. As illustrated in FIG. 6, support feet 280 are also provided on attachment structure 100 apart from hook type connectors 255 and 270 to provide stability for the enclosed structure during operation of rotational apparatus 10. Support feet 280 may be adjustable with respect to attachment structure 100.

Figure 14:
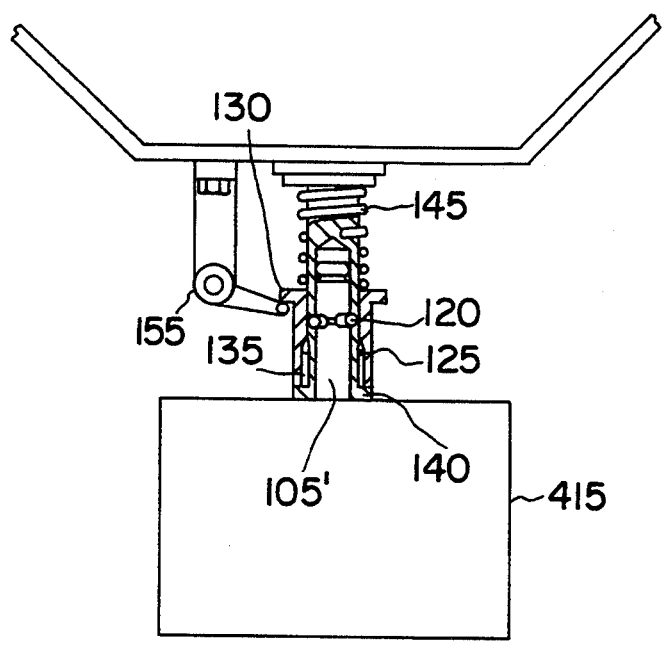
FIG. 14 is a cross-sectional view of a portion of an embodiment of the present invention illustrating attachment apparatus for a mold as could be employed in other figures herein.

Another embodiment of the invention illustrated in FIGS. 2–7 is illustrated generally in FIG. 14. In this embodiment, molds 415 for molding hollow plastic containers can be held by holding means 90. The molds 415 include shafts 105' adapted to matingly engage holding means 90 so as to be rotated about the X and Y axes as described with respect to the embodiment described in FIGS. 2–7. In addition, any attachment mechanism of sufficient strength could be utilized for releasably attaching the molds to holding means 90, and holding means 90 can be any kind of connection mechanism that will securely hold a mold during the molding operation. The above description of the operation of the invention with respect to FIGS. 2–7 explains the operation of this embodiment of the invention, with molds 415 adapted for attachment to holding means 90 and whereby a plurality of second support means 75 secured to hub 70 in a common plane in this embodiment would form a multiple mold holding assembly. Holding means 90 in this embodiment would be as described above with regard to FIG. 2–7. Individual molds 415 can be replaced with a structure holding a plurality of molds, with the structure adapted to be secured to holding means 90. In addition, as would be apparent to one of ordinary skill in the art, the attachment mechanism on the molds must be of sufficient strength to securely maintain the molds in position during rotation.

Figure 8:
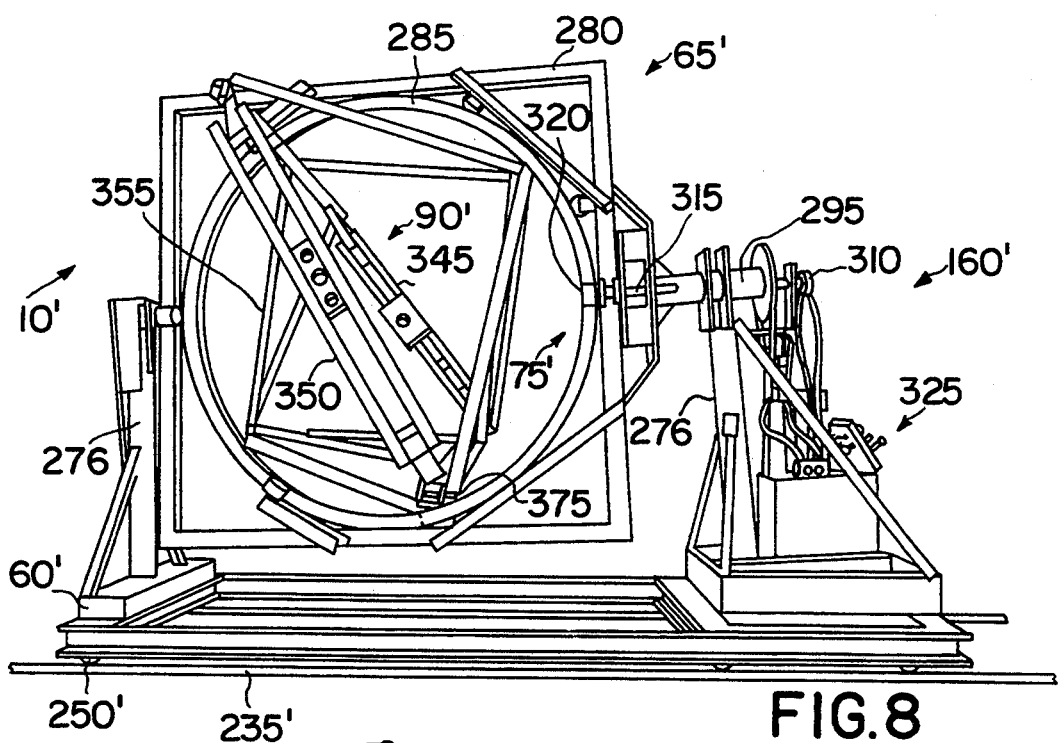
FIG. 8 is a front elevational view of a rotational apparatus for lining an enclosed structure in accordance with another embodiment of the present invention.
Figure 9:
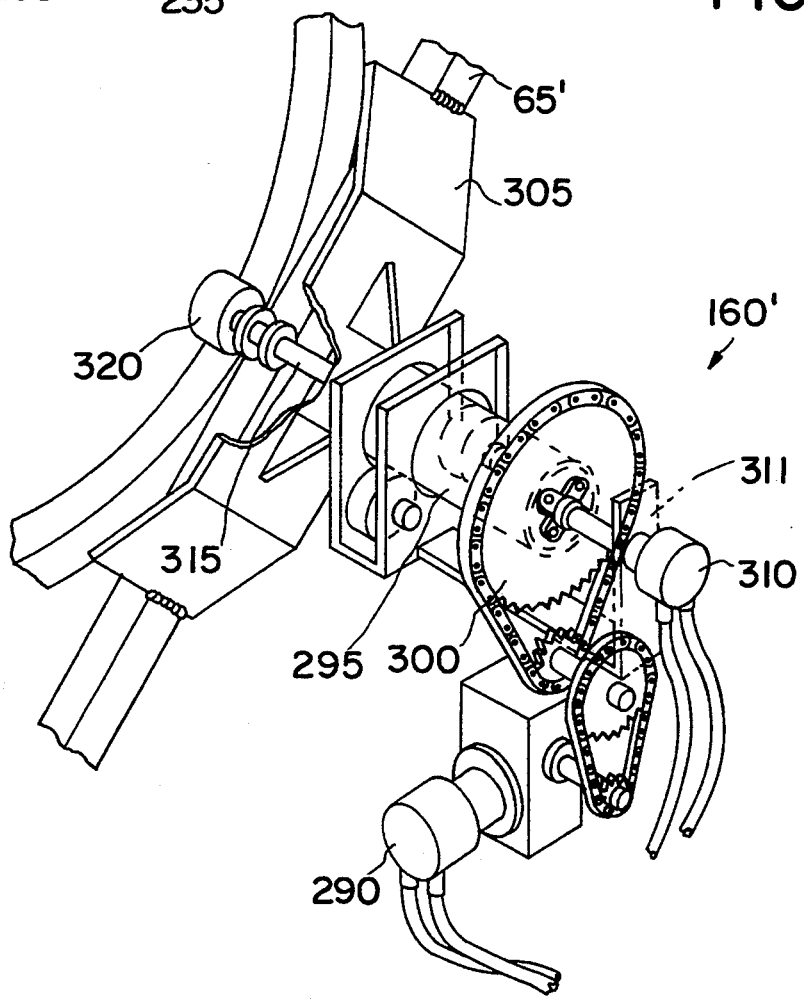
FIG. 9 is a perspective view of the drive mechanism of FIG. 8 shown in more detail.
Figure 10:
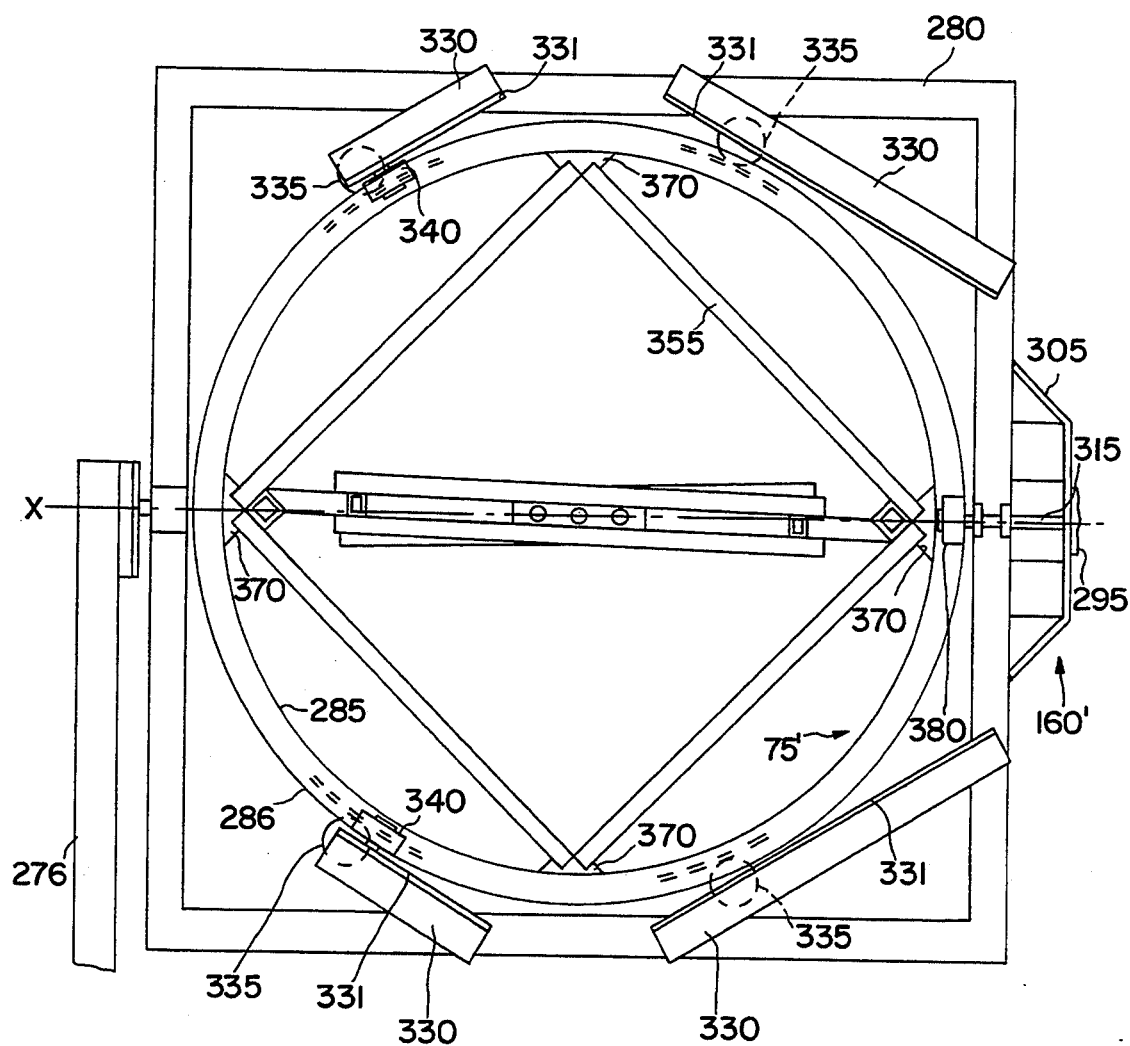
FIG. 10 is a front elevational view of the rotational apparatus of FIG. 8.

Another embodiment of the present invention is illustrated in FIGS. 8–12. Referring to FIG. 8, a rotational apparatus in accordance with this embodiment of the invention is illustrated generally at 10'. This embodiment includes a main frame 60' with wheels 250' located thereon so that main frame 60' can be moved along rails 235'. Main frame 60' includes vertical extensions 276 that provide support locations for the first support means 65'. As best illustrated in FIGS. 8 and 10, first support means 65' comprises a skeletal frame 280 that defines an opening therethrough. Skeletal frame 280 is rotatably journaled to vertical extensions 276 for rotation about the X axis. Second support means 75' comprises a frame 285 rotatable within skeletal frame 280 about second axis Y (coming out of the page in FIG. 10).

As illustrated in FIGS. 9 and 10, the means for driving in this embodiment include a drive motor 290 connected through gear and sprocket arrangement 300 to main shaft 295. Main shaft 295 is connected at 305 to first support means 65' so that first support means 65' will rotate with main shaft 295. Any suitable gear and sprocket arrangement or drive arrangement can be utilized to cause first support means 65' to rotate. In addition, the means for driving also includes a drive motor 310 held on support 311. Drive motor 310 is connected to shaft 315 for rotation within main shaft 295. Shaft 315 is connected to drive wheel 320 which is adapted to frictionally engage and drive second support means 75'. As illustrated in FIG. 8, drive means 160' includes controls 325 for controlling its operation. As would readily be apparent to one skilled in the art, any drive mechanism for driving the first and second support means would be within the scope of the present invention.

As best illustrated in FIG. 10, skeletal frame 280 includes support members 330 that include flange portions 331. Support members 330 include first support wheels 335 secured thereto and adapted to ride on frame 285 and be maintained therein on the outer circumference of frame 285 by extensions 286 that form a track for first support wheels 335 to ride in along the outer circumference of frame 285. Support members 330 also include second support wheels 340 secured for rotation on flange portions 331 for guiding frame 285 during rotation by contact with the side portions of extensions 286. It is preferred that each support member 330 include both first support wheels 335 and second support wheels 340, but it is only necessary that sufficient support wheels be provided to ensure stable rotation of frame 285 within frame 280.

Referring to FIG. 8, the means for holding an enclosed structure is generally illustrated at 90'. As embodied herein, holding means 90' comprises a first end member 345 and a second end member 350, the end members being longitudinally spaced apart by a spacing support frame illustrated as 355 in FIGS. 8 and 10. Spacing support frame 355 may include any structural arrangement that provides sufficient structural rigidity to maintain end members 345 and 350 in place during the rotational operation. End members 345 and 350 include portions 360 (FIG. 11) adapted to matingly engage elements 365 on enclosed structure 3'. Elements 365 may be part of the original enclosed structure or may be welded on or otherwise attached to the enclosed structure for the purpose of mating with portions 360. The engagement between end members 345, 350 and the enclosed structure may be of any type sufficient to securely hold the enclosed structure in place during rotation.

Figure 13:
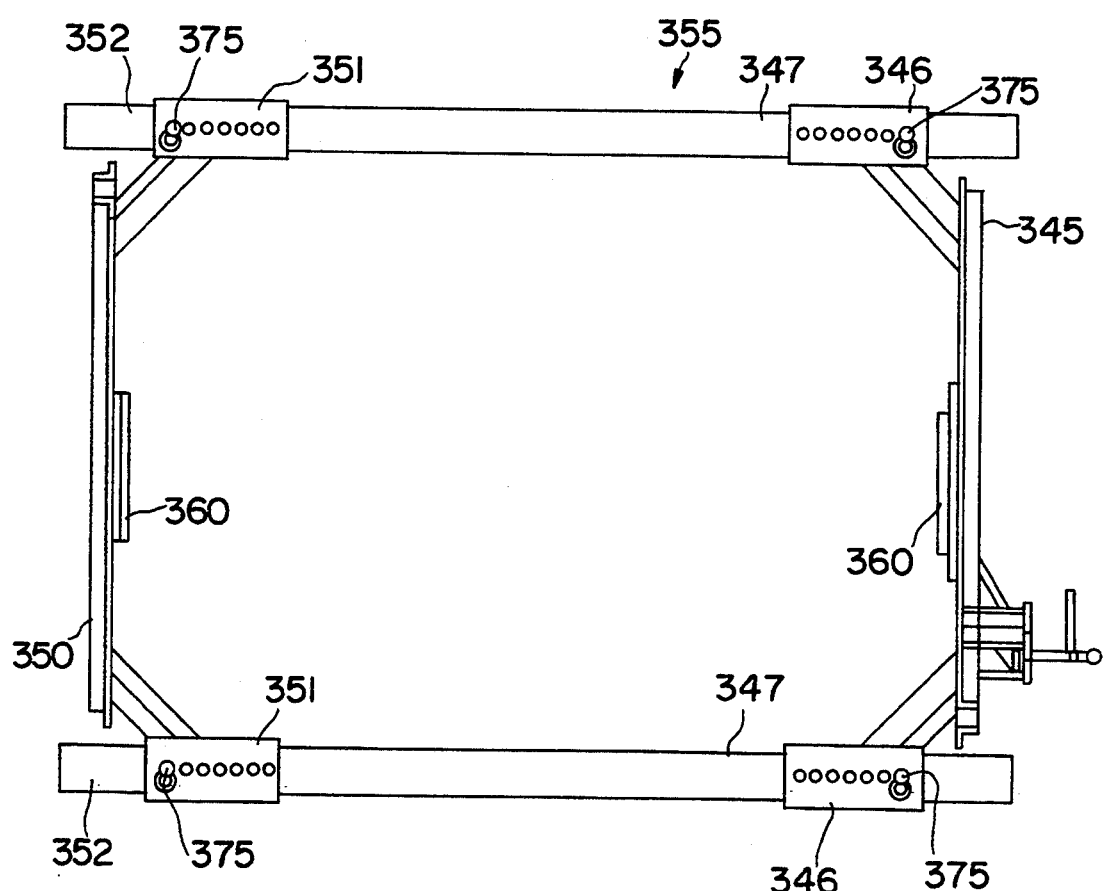
FIG. 13 is a detailed view of the longitudinal adjustment for the end members illustrated in FIG. 11.

As illustrated in FIG. 10, spacing support frame 355 is adapted to be attached to second support means 75' at 370 such as by bolting or welding or any other suitable releasable or permanent attachment means. As best illustrated in FIG. 13, first end member 345 and second end member 355 are adapted to be longitudinally adjustable with respect to each other so that a variety of sizes of enclosed structures can be held therebetween. This may be accomplished, as illustrated in FIG. 13, by each end member 345, 350 including portions 346, 351, respectively, that slidably engage portions 347, 352, respectively, of the spacing support frame 355 for movement along the spacing support frame so that the end members can be moved closer or farther apart depending on the size of the enclosed structure to be held. The end members may be held in place by pins or bolts 375 extending through aligned holes in the end members and spacing support frame.

Figure 11:
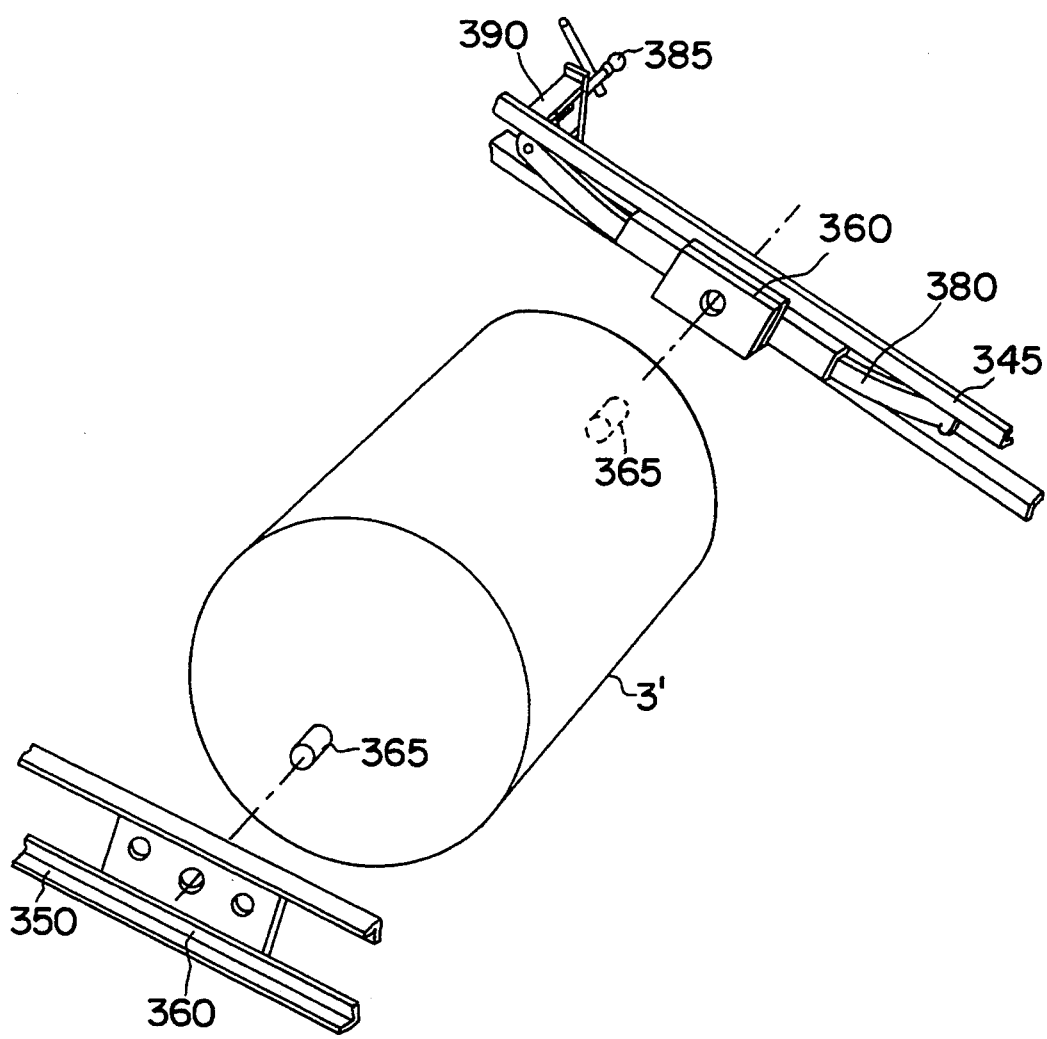
FIG. 11 is an exploded view of end members in accordance with the embodiment illustrated in FIG. 8 illustrating the relationship with an enclosure.
Figure 12:
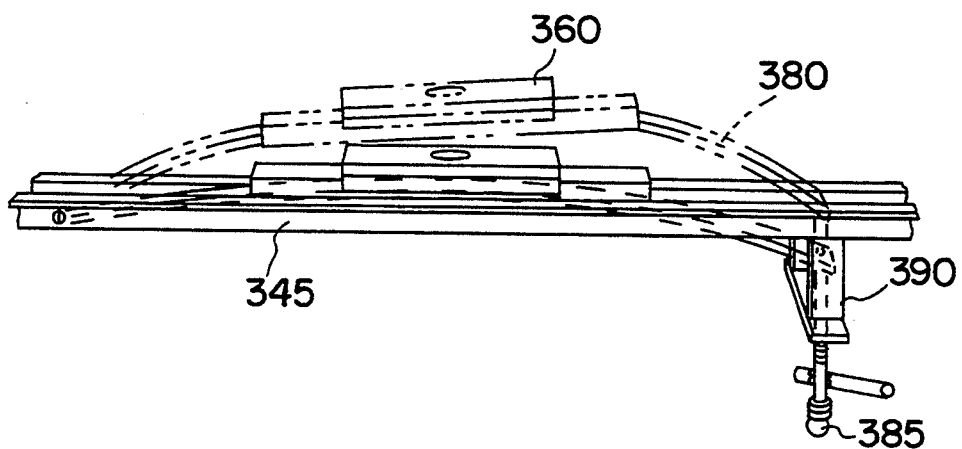
FIG. 12 is a detailed view of one end member in FIG. 11 showing adjustability for securement of an enclosure.

As illustrated in FIGS. 11 and 12, first end member 345 may include a leaf spring 380 that supports portion 360 that is adapted to receive element 365. First end member 345 may also include a bolt mechanism 385 connected to an end of leaf spring 380 that interacts with abutment 390 to tighten leaf spring 380 in first end member 345 from the position illustrated in solid lines in FIG. 12 to the extended position illustrated in broken lines. This allows flexibility in the holding means to compensate for expansion and contraction of the holding means 90' during the rotational operation when heat is applied.

Another preferred form of the present invention is embodied in a rotational process for lining the interior of enclosed structures such as vessels and the like. The process includes the steps of securing an enclosed structure such as illustrated at 3 in FIG. 3 to a frame adapted to rotate the enclosed structure about a first and second axis. This frame may be of the type illustrated in FIGS. 2–4, or of the type illustrated in FIG. 8, or of any type that would allow performance of the step. The process further includes the step of loading the interior of the enclosed structure with a charge of polymeric material for bonding to the inside surface of the enclosed structure for substantially complete coverage of the inside surface. The charge may be loaded in any conventional manner.

The process further includes the step of rotating the charged structure simultaneously about the first and second axes and heating the structure during rotation to a temperature sufficient to cause melting of the polymeric material to ensure flow about the inside surface of the enclosed structure and subsequent chemical bonding of the polymeric to the inside surface of the enclosed structure.

The process may also include the step of heating the enclosed structure to a temperature slightly below the melting temperature of the polymeric material prior to heating the structure to a temperature sufficient to cause melting of the polymeric material, and holding the temperature below melting for a predetermined period of time sufficient to allow the entire inside surface of the structure to reach a substantially uniform temperature. This predetermined period of time may be determined using conventional heat transfer equations for the particular enclosed structure being utilized. The melting temperature of the charge will be determined by the particular polymeric material utilized. The process may also include the step of cooling the structure to form a protective polymeric lining of uniform thickness over substantially the entire inside surface of the enclosed structure. Cooling may be accomplished by utilizing a fan to circulate ambient air or by a water spray directed around the enclosed structure.

In a preferred embodiment, the enclosed structure may include an internal hollow member such as illustrated at 180 in FIG. 7, and the process may include the further step of pre-heating the internal hollow member so that it reaches the melting temperature of the polymeric material at least as early as the inside surface of the enclosed structure. The process may include the step of pre-heating the internal member with forced heated air, or instead may include the step of pre-heating the hollow internal member with electrical means as disclosed above.

Linings produced within enclosed structures according to the present invention are preferably produced from polymeric materials that bond to the inside surfaces of the structure, for example, the inside of a metal hot water tank. In fact, the bond achieved is believed to be chemical in nature for attempts to separate same occur across the polymer itself instead of at the polymer-metal interface.

Polymers suitable for achieving the bonded lining according to the present invention are polyolefins having functional monomers grafted thereto. Such polymeric materials when brought into contact with the metal surface, heated to a temperature between the melting point of the polymer and its degradation temperature, will in a predetermined period of time provide a coating on the surface that is bonded thereto.

The polyolefins may be in homopolymer or copolymer form, such as polyethylenes, polypropylenes, ethylene vinyl acetate and the like, and the functional monomers are exemplified by acrylic acid, methacrylic acid, maleic anhydride and the like. Suitable exemplary commercial polymeric materials suitable for use according to the present invention are the POLYBOND products manufactured by BP Performance Polymers, Inc. and the PLEXAR products manufactured by Quantum Chemical Corporation.

The lining of an enclosed structure according to the present invention may be better understood by reference to the following examples.

EXAMPLE 1

A mild steel water tank having a capacity of approximately 300 gallons was secured in place within a rotational apparatus as depicted in FIGS. 8–10 and a charge of POLYBOND 2021, a low density polyethylene with an acrylic acid functional monomer grafted thereto was placed therein. The charge was approximately 35 pounds as determined by calculation of inside surface area of the tank to yield a lining of approximately ⅛ inch in thickness.

After charging the structure (which has also been done prior to mounting to the rotational support), the charged enclosure was moved into the oven where it was preheated to a temperature of 250° F. (below the melting point temperature of approximately 275° F.) to ensure uniformity of metal temperature during the coating application. By setting oven temperatures and monitoring cycling of the heat source, evenness of metal temperature was determined by leveling off of the off-on cycling of the heat source. Thereafter, oven temperature was set for about 450° F. (between the melting point and degradation point of the polymeric material). During oven time, the enclosed structure was continuously rotated about both the X and Y axes, and as temperature reached the melting point of the polymer, inside surfaces of the structure began to be lined with same.

Rotation continued for about 22 minutes after oven temperature reached a temperature of 375° F. Thereafter, the mounted structure was removed from the oven and quenched with a water spray which solidified the polymeric lining.

Observation of the lining showed a smooth dull uniform coating over all inside surfaces of the structure. Upon attempting to peel the coating from the metal, failure occurred across the polymer, indicating a bond at the polymer-metal interface.

EXAMPLE 2

Example 1 was repeated with a PLEXAR 232 resin, a low density polyolefin with a functional monomer. Like results were obtained.

EXAMPLE 3

Example 1 was repeated with a POLYBOND 1016 resin, a polypropylene-rubber polymer with a maleic anhydride functional monomer, with the exception that a holding time of about one hour was necessary at the higher temperature. Like results were obtained.

EXAMPLE 4

To arrive at a proper holding time above the melting point of the polymer, a series of tests were run, with peel tests conducted on the coatings. Basic observations of the coating, however, turned out to demonstrate success of the observation. A smooth coating having a dull appearance indicated a successful operation. A rough coating indicated too little rotational time to achieve a uniform coating and a shiny coating indicated overheating to the point of polymer degradation and improper or no bonding.

EXAMPLE 5

Further tests were performed on structures according to Example 1 to determine whether preparation of the surface was important. Results indicated that sand blasting of the surface and acid wash of the surface were acceptable though a caustic wash caused lessening of bonding of the lining to the mild surfaces.

EXAMPLE 6

An enclosed structure having an internal pipe of the general type as shown in FIG. 14 was processed according to Example 1. It was determined that inadequate coating of the internal pipe was achieved due to temperature differential between the internal pipe and walls of the structure.

EXAMPLE 7

Example 6 was repeated with the internal pipe preheated with hot air. A successful smooth full coating was achieved on all internal surfaces of the structure.

Figure 15:
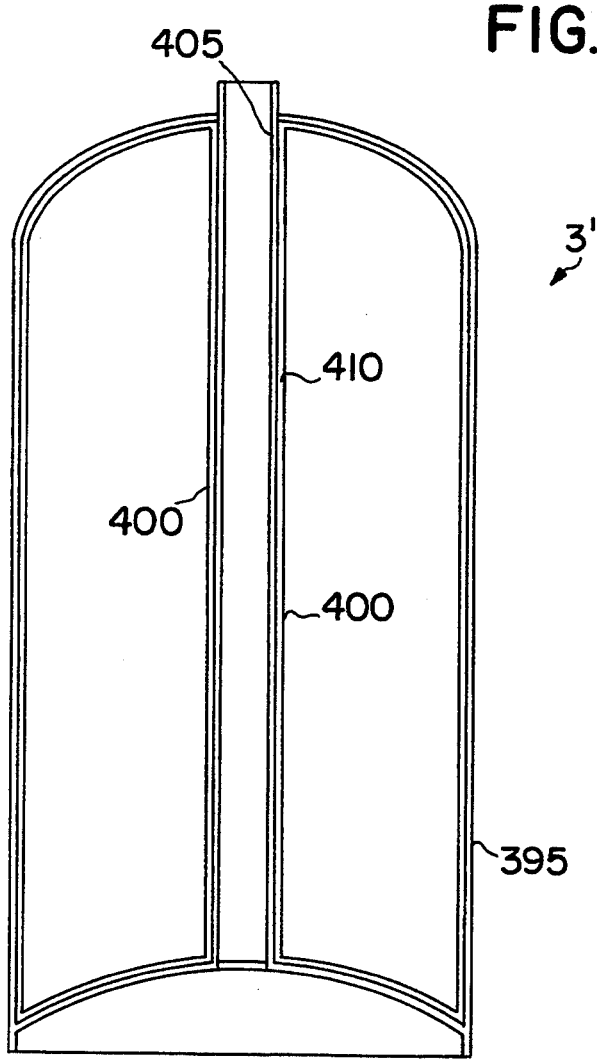
FIG. 15 is a cross-sectional view of one lined enclosed structure according to teachings of the present invention.
Figure 15A:
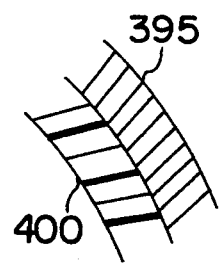
FIG. 15A is an enlarged section of a portion of the enclosed structure of FIG. 15 to illustrate cross-hatching according to materials.

As illustrated in FIG. 15, the present invention may also be embodied as an enclosed vessel 3' such as a water tank or storage drum or the like comprising an enclosed metal structure 395 including an inside surface capable of oxidation. The vessel may also include a protective polymeric lining 400 covering substantially all of the inside surface. The protective polymeric lining 400 is preferably chemically bonded to the inside surface of the enclosed metal structure. In a preferred embodiment, the protective polymeric lining comprises a polyolefin having functional monomers chemically attached thereto as described above. Further, in a preferred embodiment, protective polymeric lining 400 may have a thickness of approximately between about 1/32 inch to about ⅛ inch depending upon the size of the structure. For tanks, for example, having a capacity of about 35 gallons or less, a lining thickness of about 1/32 inch is adequate whereas for large tanks a lining thickness of about ⅛ inch is appropriate.

The lining being bonded to the inside surface of the enclosed structure affords protection against oxidation or other deterioration. In addition, depending on the polymer selected, the lining will be impervious to many mineral acids. Further, the enclosed structure can be mild steel, a cast iron, aluminum, stainless steel or various alloys.

In another preferred embodiment, enclosed metal structure 395 includes an internal hollow member 405 with an outer surface 410 inside enclosed structure 395, and wherein the protective polymeric lining is chemically bonded to and substantially completely covers outer surface 410 of internal hollow member 405.

These and other modifications and variations of the present invention may be practiced by those of ordinary skill in the art, without departing from the spirit and scope of the present invention, which is more particularly set forth in the appended claims. In addition, those of ordinary skill in the art will recognize that features and aspects of the various embodiments of the present invention are interchangeable, in part or in whole. Furthermore, those of ordinary skill in the art will appreciate that the foregoing description is by way of example only, and is not intended to be limitative of the invention so further described in such appended claims.

What is claimed is:

1. A process for chemically bonding a polymeric lining to the interior surface of an enclosed structure such as a vessel or the like, comprising the steps of:
    (a) securing said enclosed structure to an apparatus adapted to rotate said enclosed structure about a first and a second axis;
    (b) loading the interior of said enclosed structure with a charge of polymeric material, said charge comprising a sufficient amount of polymeric material to cover substantially the entirety of said interior surface, said polymeric material having the capability of chemically bonding to said interior surface of said enclosed structure;
    (c) rotating said loaded enclosed structure about said first and second axes while heating said structure to ensure that said polymeric material will flow sufficiently to cover substantially the entirety of said interior surface and to chemically bond said polymeric material to said interior surface;
    (d) discontinuing said rotation and said heating and allowing said enclosed structure to cool so that the polymeric material is chemically adhered to said interior surface in the form of a lining; and
    (e) removing said enclosed structure from said apparatus to obtain an enclosed structure having a polymeric lining chemically bonded to its interior surface.

2. A process as in claim 1 wherein said polymeric material is a polyolefin having functional monomers chemically attached thereto.

3. A process as in claim 1 further including the step of heating said structure to a temperature slightly below the melting temperature of the polymeric material prior to heating said structure to a temperature sufficient to cause melting of the polymeric material, and holding said lower temperature for a predetermined period of time sufficient to allow the entire inside surface of the structure to reach a substantially uniform temperature.

4. A process as in claim 1 wherein the enclosed structure includes an internal hollow member, and including the further step of pre-heating the internal hollow member so that it reaches the melting temperature of the polymeric material at least about the same time as the inside surface of the enclosed structure.

5. A process as in claim 1 above, including the step of pre-heating said hollow member with forced heated air.

6. A process as in claim 1 above, including the step of pre-heating said hollow member with electrical means.

7. A process as in claim 1 above, wherein said enclosed structure is a water heater.

8. A process for producing a lining within an enclosed structure comprising the steps of:

loading a predetermined charge of a polymeric material into an enclosed structure, said polymeric material being capable of chemical bonding with an inside surface of said enclosure;

locating said charged structure within an oven at a temperature between the melting point and degradation point of the polymeric material, and adequate to cause chemical bonding;

continuously rotating said charged structure about first and second axes for a predetermined time to cause polymeric material to flow over all inside surfaces of said enclosure and to become bonded thereto and to form a smooth coating over all inside surfaces;

removing said coated enclosure from said oven and cooling said enclosure while continuing to rotate same about said first and second axes to form a solid protective coating over said inside surfaces of said structure.

9. The process as defined in claim 1, wherein said enclosed structure is a tank.

10. The process as defined in claim 9, wherein said tank is a hot water tank.

* * * * *

UNITED STATES PATENT AND TRADEMARK OFFICE
CERTIFICATE OF CORRECTION

| | |
|---|---|
| PATENT NO. | : 5,358,682 |
| APPLICATION NO. | : 07/749160 |
| DATED | : October 25, 1994 |
| INVENTOR(S) | : L. Keith Rogerson |

It is certified that error appears in the above-identified patent and that said Letters Patent is hereby corrected as shown below:

Column 14 line 44 cancel the text beginning with "discontinuing said rotation and said heating and." Therefore, Claim 1 subsection (d) should read as follows:

(d) allowing said enclosed structure to cool so that the polymeric material is chemically adhered to said interior surface in the form of a lining; and Signed and Sealed this Twenty-first Day of December, 2010

David J. Kappos
*Director of the United States Patent and Trademark Office*